United States Patent
Piciaccia et al.

(10) Patent No.: US 9,083,458 B2
(45) Date of Patent: Jul. 14, 2015

(54) SELF-TUNING AN OPTICAL NETWORK AT AN OPERATING POINT

(71) Applicant: Cisco Technology, Inc., San Jose, CA (US)

(72) Inventors: Stefano Piciaccia, Milan (IT); Rosanna Pastorelli, Melegnano (IT); Mauro Brunella, Brugherio (IT)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 13/937,613

(22) Filed: Jul. 9, 2013

(65) Prior Publication Data

US 2015/0016819 A1    Jan. 15, 2015

(51) Int. Cl.
*H04B 17/00* (2006.01)
*H04B 10/079* (2013.01)

(52) U.S. Cl.
CPC ........ *H04B 10/0793* (2013.01); *H04B 10/0797* (2013.01)

(58) Field of Classification Search
CPC .................. H04J 2203/0055; H04J 2203/0058
USPC .................... 398/26, 37, 38; 359/337, 337.13
See application file for complete search history.

(56) References Cited

U.S. PATENT DOCUMENTS

| | | | | |
|---|---|---|---|---|
| 5,173,896 | A * | 12/1992 | Dariano | 370/249 |
| 5,367,394 | A * | 11/1994 | Chuter et al. | 398/33 |
| 5,471,334 | A * | 11/1995 | Masuda et al. | 359/337 |
| 5,521,751 | A * | 5/1996 | Aida et al. | 359/337 |
| 5,969,840 | A * | 10/1999 | Roberts | 398/32 |
| 6,040,933 | A * | 3/2000 | Khaleghi et al. | 398/1 |
| 6,229,631 | B1 * | 5/2001 | Sato et al. | 398/30 |
| 6,377,396 | B1 * | 4/2002 | Sun et al. | 359/341.42 |
| 6,392,769 | B1 * | 5/2002 | Ford et al. | 398/9 |
| 6,633,430 | B1 * | 10/2003 | Monnard et al. | 359/337.11 |
| 2004/0005151 | A1 * | 1/2004 | Pitchforth, Jr. | 398/37 |
| 2004/0036960 | A1 * | 2/2004 | Ramachandran | 359/341.41 |
| 2004/0197105 | A1 * | 10/2004 | Khatana et al. | 398/173 |
| 2005/0180757 | A1 * | 8/2005 | Nissov et al. | 398/147 |
| 2007/0014571 | A1 * | 1/2007 | Roberts et al. | 398/25 |

(Continued)

OTHER PUBLICATIONS

Poggiolini, et al., "The LOGON Strategy for Low-Complexity Control Plane Implementation in New-Generation Flexible Networks," Optical Fiber Communication Conference, Mar. 17-21, 2013, 3 pages.

*Primary Examiner* — Ken Vanderpuye
*Assistant Examiner* — Jose Luis F Pugeda
(74) *Attorney, Agent, or Firm* — Edell, Shapiro & Finnan, LLC

(57) ABSTRACT

Techniques are presented for automatic tuning of operating parameters, e.g., amplifier gain, in an optical network. A section of an optical network comprises a plurality of spans between optical nodes, and each optical node has an amplifier to amplify optical signals for transmission between optical nodes. Physical network layer data is obtained from the optical nodes for use as input to an analytical model. A set of powers defining an optimum working point of the amplifiers is computed based on variations in amplifier noise figure which depend on amplifier gain. A figure of merit representative of network section performance is computed based on linear and non-linear noise at current power levels of the amplifiers. The figure of merit is evaluated. The set of powers is applied to the amplifiers in the network section when evaluation of the figure of merit indicates that network performance improvement can be achieved.

20 Claims, 7 Drawing Sheets

(56) References Cited

U.S. PATENT DOCUMENTS

| | | | |
|---|---|---|---|
| 2008/0219664 A1* | 9/2008 | Zaacks et al. | 398/58 |
| 2010/0272445 A1* | 10/2010 | Inagaki et al. | 398/160 |
| 2013/0028599 A1* | 1/2013 | Sone et al. | 398/37 |
| 2013/0278333 A1* | 10/2013 | Corral | 330/144 |
| 2014/0022626 A1* | 1/2014 | Eliyahu et al. | 359/334 |

* cited by examiner

SELF-TUNING AN OPTICAL NETWORK AT AN OPERATING POINT

TECHNICAL FIELD

The present disclosure relates to optical networks.

BACKGROUND

Optical signals in an optical network are impacted by different sources of noise during their propagation from a source to a destination. Optical impairments can be categorized into three main types: (1) added noise from the optical amplification process (e.g., noise due to Amplified Spontaneous Emission (ASE)); (2) noise sources external to amplifiers and not dependent on signal power; and (3) non-linear noise, dependent on per channel signal power.

Impairments due to amplification noise and non-linear noise depend on the "working point" that has been selected for a specific system. A "working point" refers to and is based on per channel power and amplifier gain, which in turn is related to the noise optimization of an Erbium-doped Fiber Amplifier (EDFA). Noise optimization of an optical amplifier is generally managed during the design phase. However, after the design phase and once the optical network is deployed, network conditions can occur that may necessitate changes to one or more optical amplifiers in the network.

DESCRIPTION OF EXAMPLE EMBODIMENTS

Overview

Figure 1:
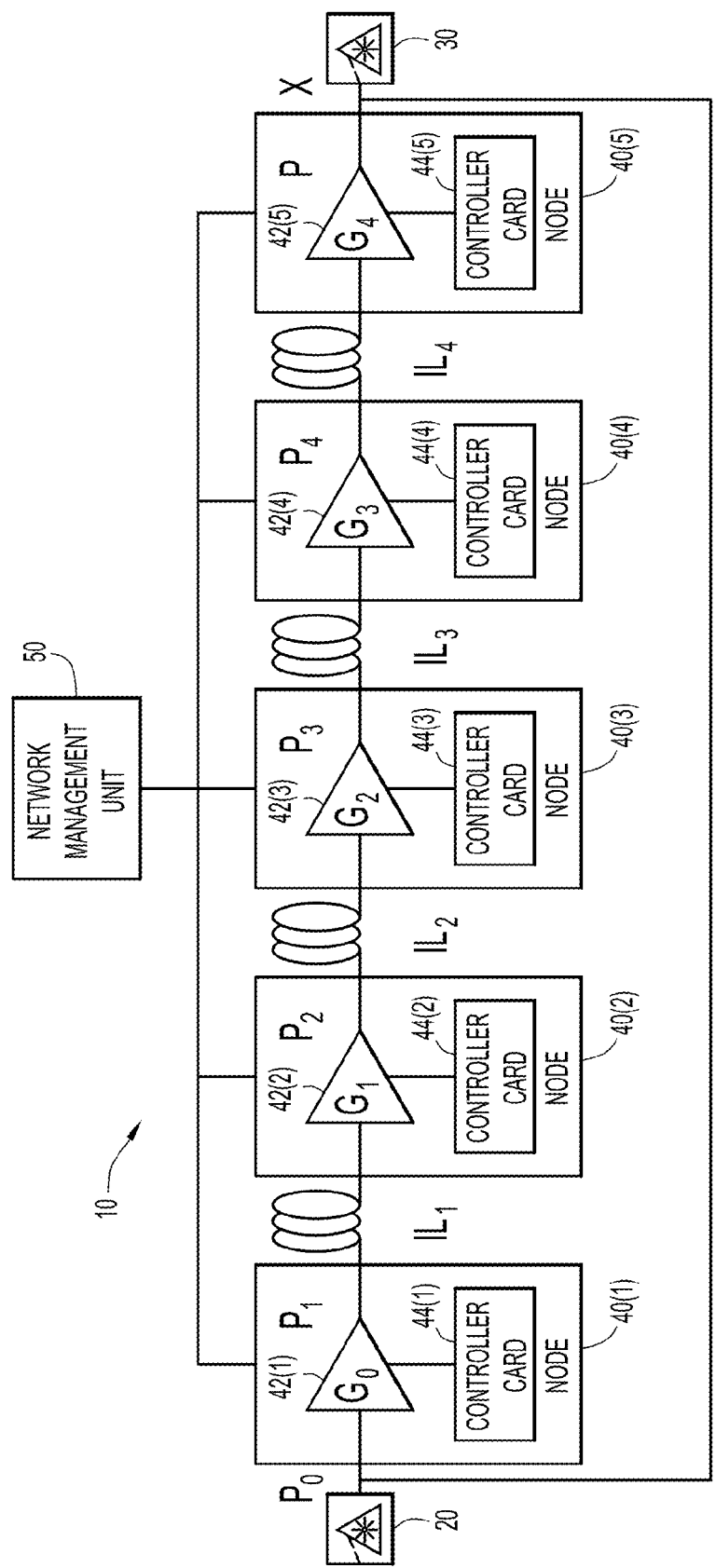
FIG. 1 illustrates an example of a section of an optical network for purposes of describing the optical network self-tuning techniques according to embodiments presented herein.

Techniques are presented for automatic tuning of operating parameters, e.g., amplifier gain, in an optical network. A section of an optical network comprises a plurality of spans between optical nodes, and each optical node has an amplifier to amplify optical signals for transmission between optical nodes. Physical network layer data is obtained from the optical nodes for use as input to an analytical model. A set of powers defining an optimum working point of the amplifiers in the network section is computed based on variations in amplifier noise figure which depend on amplifier gain. A figure of merit representative of performance of the network section is computed based on linear and non-linear noise at current power levels of the amplifiers. The figure of merit is evaluated. The set of powers is applied to the amplifiers in the network section when evaluation of the figure of merit indicates that network performance improvement can be achieved by applying the set of powers to the amplifiers.

Example Embodiments

In transparent optical networks, the feasibility of a lightpath depends on the Physical Layer Impairments (PLIs) affecting the optical signal. These impairments reduce the possibility of correct detection of the transmitted information at the receiver. In non-coherent optical networks, PLIs cannot be calculated with good accuracy as a sum of per-span additive contributions, and instead involves a complex end-to-end simulation of the channel based on the current network status that varies with traffic and topology changes. Thus, the management of the PLIs is very complex for a control plane, whether implemented as a distributed or centralized control plane.

Next-generation flexible optical networks, based on coherent optical detection and uncompensated transmission, allow for the introduction of an innovative approach in the control plane and network configuration management. This new approach is enabled by the fact that, in the case of pure coherent traffic, both linear and non-linear PLIs can be calculated as a sum of per-span additive contributions. Furthermore, based on the maximization of the optical signal-to-noise ratio in each reconfigurable optical add-drop multiplexer (ROADM)-to-ROADM section independently, a recently proposed analytical model allows for the Global Optimization of the network performance through Local Optimization (the so-called LOGO model).

In a scenario where services with coherent modulation are provisioned, PLIs can be evaluated with per-span analytical functions instead of full signal simulations, providing a single Figure of Merit (FoM) for each link. The FoM can be transported in an agile manner by Optical Shortest Path First-Traffic Engineering (OSPF-TE) techniques. OSPF-TE can also be used to carry the information about the wavelength availability, since, when planning at full channel load conditions, the information about the specific wavelength associated to a path is no longer necessary. This approach allows for the full evaluation of the path in the source node due to the availability of the FoM of each link among the nodes of the network, thereby achieving a routing-based optical control plane.

A software design tool is used to design an optical network. The design tool determines, according to the design information (span length, loss, required traffic matrix, fiber characteristics, etc.), a system working point. ASE noise generation and non-linear noise generation are managed independently. This information is provided to the different nodes of the optical network.

A network management application maintains operation of the optical network, keeping the assigned targets (for channel power, gain, etc.) at their nominal value during the lifetime of the optical network. By maintaining communication between the deployed optical network and a network planning/design tool, new working points may be assigned to the system, for instance in case of different traffic planning, or modified link conditions (e.g., a cable repair with added insertion loss).

The introduction of a new coherent modulation format is giving rise to simplification opportunities in the design and control of an optical network. Optimization that previously had to be made based on the complete source-to-destination path, can now be done at the level of individual spans or sections. The "optimum" operating point is based on local characteristics. Furthermore, ASE noise generation and non-linear noise generation can be simultaneously optimized. Non-linear noise is additive in optical channels that use coherent light. Previously, this computation had to be performed from source-to-destination.

This new behavior allows a simplified process for the network management application to keep the channel power at an assigned design value, as well as to obtain the local characteristics of a span (amplifier noise figure (NF), span length, loss, etc.) in order to calculate and adjust optimum power in real-time.

Presented herein are techniques to implement self-adjustment to an optimum point ("working point) of the power at nodes in a section (or multiple sections) of an optical network. Moreover, it has been discovered that it is possible to manage, at the same time, both ASE noise of amplifiers and non-linear noise from transmission. A generalization of this method has been developed to provide real-time automatic power control to set the amplifier working point to an optimum level taking into account the relationship between amplifier noise figure and amplifier gain, and for amplifiers within a ROADM-ROADM section of an optical network. It has been determined that the optimization be performed, not at the span level (between two optical amplifiers), but in a section (encompassing multiple spans) between nodes that can adjust optical power channel by channels, e.g., nodes such as ROADMs and gain equalizers. These techniques may be used to optimize non-coherent optical networks, particularly when an underestimation of the channel's performance is acceptable.

Referring first to FIG. 1, a diagram is shown of an example section of an optical network. The section is shown generally at reference numeral 10. In this example, the section 10 comprises multiple spans between a first node (source) 20 and a second node (destination) 30. Specifically, the section 10 includes optical amplifiers in each of nodes 40(1)-40(5), in an example where there are five optical amplifiers (and nodes) in the section 10. There may be, in real world deployments, numerous nodes, as would be appreciated by those with ordinary skill in the art.

For example, there is an optical amplifier 42(1) with gain $G_0$ in node 40(1), optical amplifier 42(2) with gain $G_1$ in node 40(2), optical amplifier 42(3) with gain $G_2$ in node 40(3), optical amplifier 42(4) with gain $G_3$ in node 40(4), and optical amplifier 42(5) with gain $G_4$ in node 40(5). There is also a controller card in each node, i.e., a controller card 44(1) in node 40(1), a controller card 44(2) in node 40(2), a controller card 44(3) in node 40(3), a controller card 44(4) in node 40(4), and a controller card 44(5) in node 40(5). FIG. 1 also shows that there is a power level at each of the points along the section 10. For example, the power level at the input to node 40(1) is $P_0$ and at the output of node 40(1) is $P_1$. Similarly, the power level at the output of node 40(2) is $P_2$, the power level at the output of node 40(3) is $P_3$, the power level at the output of node 40(4) is $P_4$, and the power level at the output of node 40(5) is X, which corresponds to the power at destination 30.

FIG. 1 also shows a network management unit 50 that is in communication with each of the optical nodes 40(1)-40(5). The network management unit 50 may be a server computer, an application running in the controller card of one of the network nodes 40(1)-40(5), or an application running in a data center.

The network management unit 50 may run an application that calculates in real-time the optimum working point (power per channel and EDFA working point), in order to maintain the optical system in its best operating region. In the physical layer of the network, an automatic power control algorithm is executed in real-time according a model, (e.g., a proposed extension of the LOGO model), to perform (i) the simultaneous evaluation of both linear and non-linear impairments in each link of the network and (ii) the identification and consequent setting of the optimum amplifier powers that maximize overall network performance. The implementation of the extended LOGO model ensures that, regardless of the sequence of links (section of the network between two add/drop nodes) between the source and the destination nodes of an optical path, the channel is working at the minimum pre-forward error correction (FEC) bit error rate. The channel performance can be computed by adding the linear and non-linear noise contribution of each link of the path.

To do this, the automatic power control algorithm uses (i) the physical parameters directly retrievable from the network status, such as span losses, amplifier characteristics (gain ranges, output power ranges and noise figure), and (ii) network parameters that are made available at network management level, such as number of channels at full channel load and channel baud-rate, fiber characteristics (type, length and concentrated losses). The latter information can be automatically retrieved by the system when specific hardware or a software application is available for span characterization.

Using real-time data retrieved from the network physical layer and knowledge of the full channel load traffic requests, the automatic power control algorithm optimizes the network settings and evaluates the linear and non-linear noise contribution of each link of the network. Adding the linear and the non-linear noise of each link in the path, the total signal-to-noise ratio (SNR) of the route is computed.

In the case of a non-ideal system, the amplifier noise figure (NF) depends on the amplifier gain set point. This behavior impacts the optimum working point of the link. This impact is derived analytically and a method is provided to optimize the network working point based on network topology.

In each single span, the generated noise includes ASE noise and non-linear noise that is mathematically represented as:

$$\frac{1}{OSNR_i} = \frac{1}{OSNR_{ASEi}} + \frac{1}{OSNR_{NLi}} \quad (1)$$

where $$OSNR_{ASEi} = \frac{1}{W} \frac{P_i}{IL_i NF_i(G_i)}; \; G_i = \frac{P_{i+1} IL_i}{P_i};$$

$$W = h\nu B; \; OSNR_{NLi} = \frac{1}{\eta_i P_i^2}$$

Replacing $$\frac{1}{OSNR_i} = W \frac{IL_i NF_i(P_i, P_{i+1})}{P_i} + \eta_i P_i^2$$

The total noise of the link is the sum of the noise contributions generated in each span, so that:

$$\frac{1}{OSNR_{eq}} = \sum_0^N \frac{1}{OSNR_i} = \quad (2)$$

$$\sum_0^{N-1} \left( W \frac{IL_i NF_i(P_i, P_{i+1})}{P_i} + \eta_i P_i^2 \right) + W \frac{IL_N NF_N(P_N, X)}{P_N} + \eta_N P_N^2$$

To optimize the link, the equivalent OSNR is maximized, which means finding the $\{P_i\}$ minimizing the following:

$$\frac{1}{OSNR_{eq}} = \sum_0^N \frac{1}{OSNR_i} = \sum_1^N \left( W \frac{IL_i NF_i(P_i, P_{i+1})}{P_i} + \eta_i P_i^2 \right);$$

where $\eta_0 = 0$

This requires:

$$\nabla \frac{1}{OSNR_{eq}} = 0 \quad (3)$$

or, equivalently, for each $P_k$ $$\frac{\partial}{\partial P_k} \frac{1}{OSNR_{eq}} = \frac{\partial}{\partial P_k}\left(W \frac{IL_k NF_k(P_k, P_{k+1})}{P_k} + \eta_k P_k^2\right) + \quad (4)$$

$$\frac{\partial}{\partial P_k}\left(W \frac{IL_{k-1} NF_{k-1}(P_{k-1}, P_k)}{P_{k-1}}\right)$$

$$= W \frac{IL_k\left(\frac{\partial NF_k(P_k, P_{k+1})}{\partial P_k}\right)P_k - IL_k NF_k(P_k, P_{k+1})}{P_k^2} +$$

$$2\eta_k P_k + W \frac{L_{k-1}\left(\frac{\partial NF_{k-1}(P_{k-1}, P_k)}{\partial P_k}\right)}{P_{k-1}}$$

$$= 0$$

Nulling the gradient, we obtain:

$$\frac{\partial}{\partial P_k} \frac{1}{OSNR_{eq}} = W \frac{IL_k\left(\frac{\partial NF_k(G_k)}{\partial P_k}\right)P_k - IL_k NF_k(G_k)}{P_k^2} + \quad (5)$$

$$2\eta_k P_k + W \frac{L_{k-1}\left(\frac{\partial NF_{k-1}(G_{k-1})}{\partial P_k}\right)}{P_{k-1}}$$

This means:

$$\begin{cases}
\frac{\partial}{\partial P_1} \frac{1}{OSNR_{eq}} = f(P_0, P_1, P_2) = 0 \\
\ldots \\
\frac{\partial}{\partial P_k} \frac{1}{OSNR_{eq}} = f(P_{k-1}, P_k, P_{k+1}) \\
\quad = W \frac{IL_k\left(-\frac{P_{k+1} IL_k}{P_k^2}\right)\frac{\partial NF_k}{\partial G}\Big|_{(G_k = \frac{P_{k+1} IL_k}{P_k})} P_k - IL_k NF_k\Big|_{(G_k = \frac{P_{k+1} IL_k}{P_k})}}{P_k^2} + 2\eta_k P_k + \\
\quad + W \frac{IL_{k-1}\left(\frac{IL_{k-1}}{P_{k-1}}\right)\frac{\partial NF_{k-1}}{\partial G}\Big|_{(G_{k-1} = \frac{P_k IL_{k-1}}{P_{k-1}})}}{P_{k-1}} \\
\quad = 0 \\
\ldots \\
\frac{\partial}{\partial P_N} \frac{1}{OSNR_{eq}} = f(P_{N-1}, P_N, X) = 0
\end{cases} \quad (6)$$

where $P_0$ and $X$ are fixed per power values at the input of the first amplifier and at the output of the last amplifier of the link. These power levels are imposed by system constraints corresponding to output and input powers at each ROADM node or dynamic gain equalization (DGE) node.

$$\frac{\partial}{\partial P_k} \frac{1}{OSNR_{eq}} = \quad (7)$$

$$hvB \frac{IL_k\left(-\frac{P_{k+1} IL_k}{P_k^2}\right)\frac{\partial NF_k}{\partial G}\Big|_{(G_k)} P_k - IL_k NF_k\Big|_{(G_k)}}{P_k^2} + 2\eta_k P_k +$$

$$hvB \frac{IL_{k-1}\left(\frac{IL_{k-1}}{P_{k-1}}\right)\frac{\partial NF_{k-1}}{\partial G}\Big|_{(G_{k-1})}}{P_{k-1}} = 0$$

$$\left[P_{ASE\,k} = hvB\, IL_k NF_k;\ G_k = \frac{P_{k+1}}{P_k} IL_k;\right.$$
$$\left.P_{ASE\,k-1} = hvB\, IL_{k-1} NF_{k-1} \frac{P_k}{P_{k-1}};\ G_{k-1} = \frac{P_k}{P_{k-1}} IL_{k-1}\right]$$

$$hvB\, IL_k \frac{NF_k}{NF_k} \frac{\partial NF_k}{\partial G}\left(\frac{P_{k+1} IL_k}{P_k}\right) + hvB\, IL_k NF_k -$$

$$hvB\, IL_{k-1}\left(\frac{P_k}{P_{k-1}}\right)\frac{NF_{k-1}}{NF_{k-1}} \frac{\partial NF_{k-1}}{\partial G}\left(\frac{P_k IL_{k-1}}{P_{k-1}}\right) = 2\eta_k P_k^3$$

$$\frac{P_{ASE\,k} \frac{\partial \ln(NF_k)}{\partial \ln(G_k)} + P_{ASE\,k} - P_{ASE\,k-1} \frac{\partial \ln(NF_{k-1})}{\partial \ln(G_{k-1})} = 2\eta_k P_k^3}{f(P_{k-1}, P_k, P_{k+1})}$$

The analytical formula is the extension of the LOGO model when applied to real optical networks. This formula reveals that:

1. The power optimization cannot be applied at the span level, as explain in the literature for the LOGO algorithm: the left term of the equation shows that the optimum power $P_k$ depends on the power $P_{k-1}$ and $P_{k+1}$.
2. The optimum power $P_k$ is influenced by the characteristics (NF vs. Gain (G)) of the amplifiers both at the launch position ($A_{k-1}$) and at the end position ($A_k$) of each span.
3. The optimization should be simultaneously applied to the set of spans between two ROADM nodes. At the input and at the output of each ROADM node, the per-channel optical powers may optionally be locked. What occurs outside the domain between two ROADM nodes cannot influence the optimization of $\{P_k\}$'s.

The numerical solution to Equation (7) uses current network parameters: fiber type and length; span loss and points of concentrated losses; traffic matrix (channel type, channel spacing and power unbalancing between channels in the Dense Wavelength Division Multiplexed (DWDM) spectrum); amplifier characteristics (NF vs. gain (G), gain range, minimum and maximum output power).

A network architecture is provided to retrieve from a network layout all the above parameters, and a numerical method is provided to solve Equation (7), including constraints, in order to automatically set the optimum network working points to optimize network performance. This method dynamically evolves with changing network conditions (e.g., losses changes, traffic matrix variation) thereby maintaining the best possible network performance.

Figure 2:
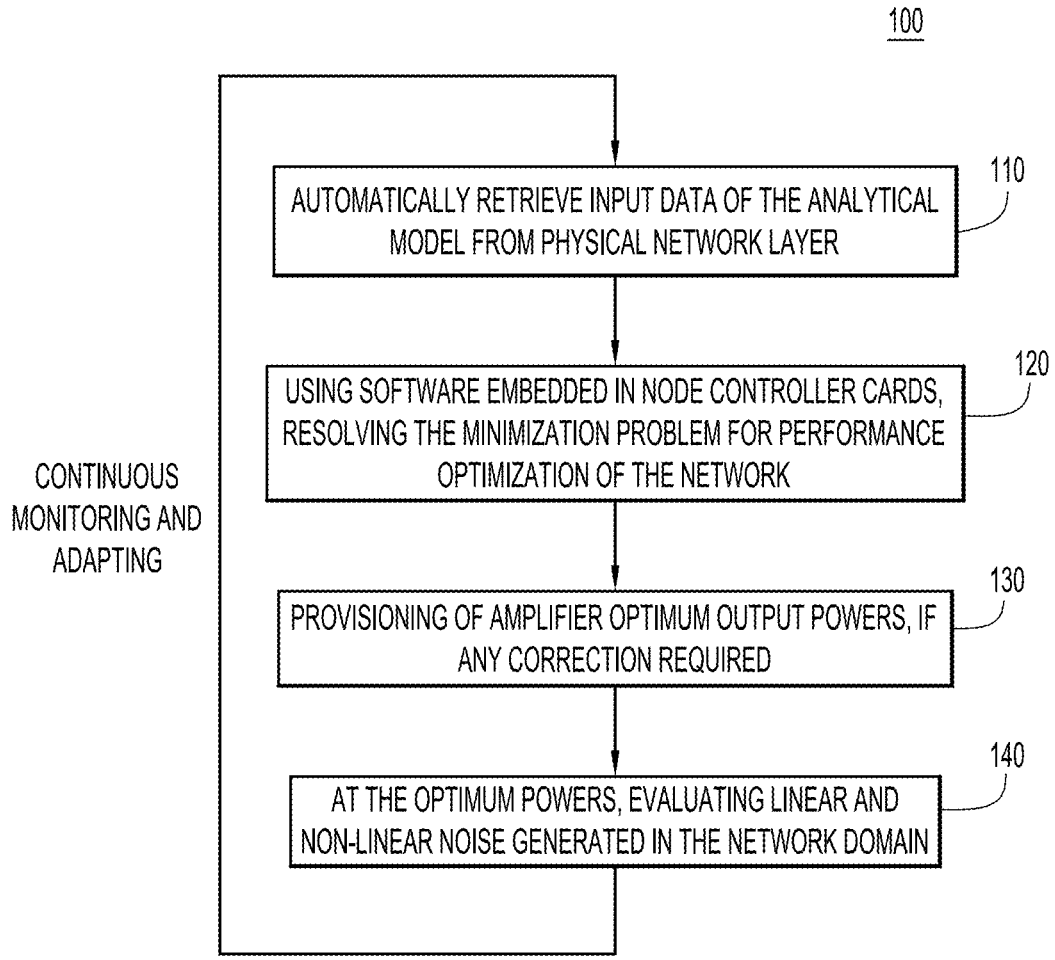
FIG. 2 is a flow diagram depicting the operations of the self-tuning techniques.

Reference is now made to FIG. 2 for a description of the overall flow of the automatic power control procedure, shown generally at reference numeral 100. The procedure 100 involves continuously monitoring physical network parameters used in an optimization model to adaptively maintain the network section at the optimum performance, and adaptively changing the powers in response to network parameter changes. At 110, the input data to the analytical model is automatically retrieved. Operation 110 is described in more detail in connection with FIG. 3. At 120, using software embedded in node controller cards, a minimization problem is resolved for performance optimization of the network. This operation is described in more detail in connection with FIG. 4. At 130, the optimum amplifier powers are provisioned if any correction is needed based on the results of operation 120. Operation 130 is described in more detail with reference to FIG. 5. At 140, the linear and non-linear noise generated in the network domain is evaluated, at the optimum amplifier powers. Operation 140 is described in more detail in connection with FIG. 6.

Figure 3:
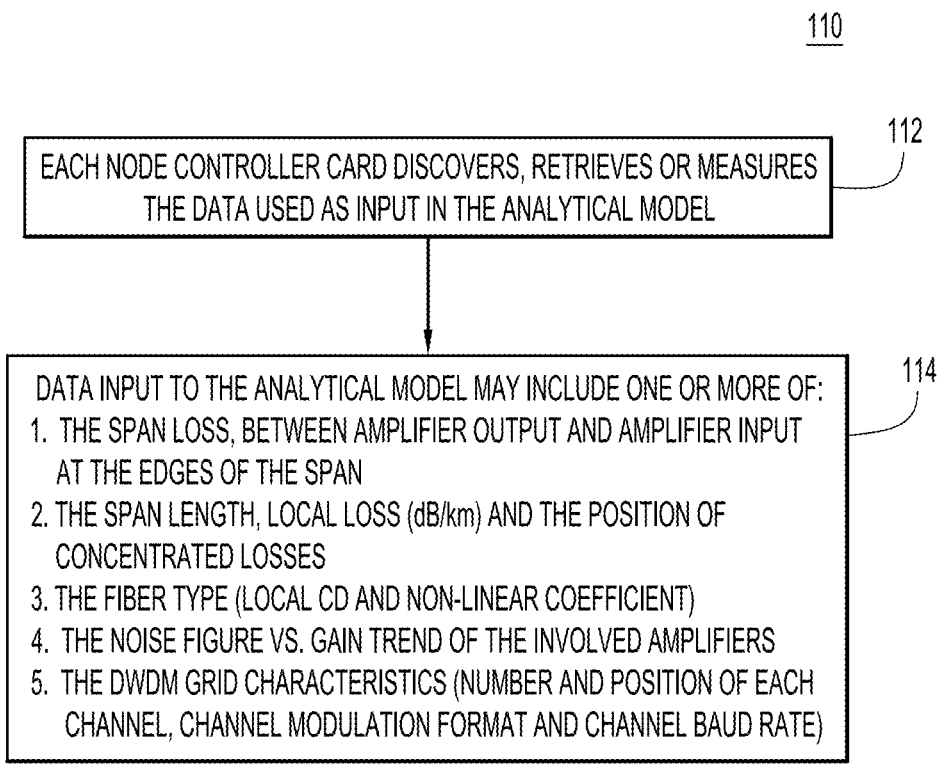
FIGS. 3-6 are flow charts illustrating in more detail the operations of the self-tuning techniques.

Turning now to FIG. 3, operation 110 of automatically retrieving input data for the analytical model from the physical network layer is now described in more detail. Specifically, at 112, for the network section under consideration, the software layer of each node controller card (shown at reference numerals 44(1)-44(5) in FIG. 1) discovers, retrieves or measures the data used as input to the model. In particular, as shown at 114, the node controller cards obtain one or more of:
1. The span loss, between amplifier output and amplifier input at the edges of the span.
2. The span length, local loss (dB/km) and the position of concentrated losses.
3. The fiber type (local chromatic dispersion and non-linear coefficient).
4. The noise figure vs. gain trend of the involved amplifiers.
5. The DWDM grid characteristics (number and position of each channel, channel modulation format and channel baud rate).

A subset or all the data above can also be provisioned by a software design tool characterizing the network layout, for example, by the network management unit 50 in FIG. 1 or a separate computing device.

Figure 4:
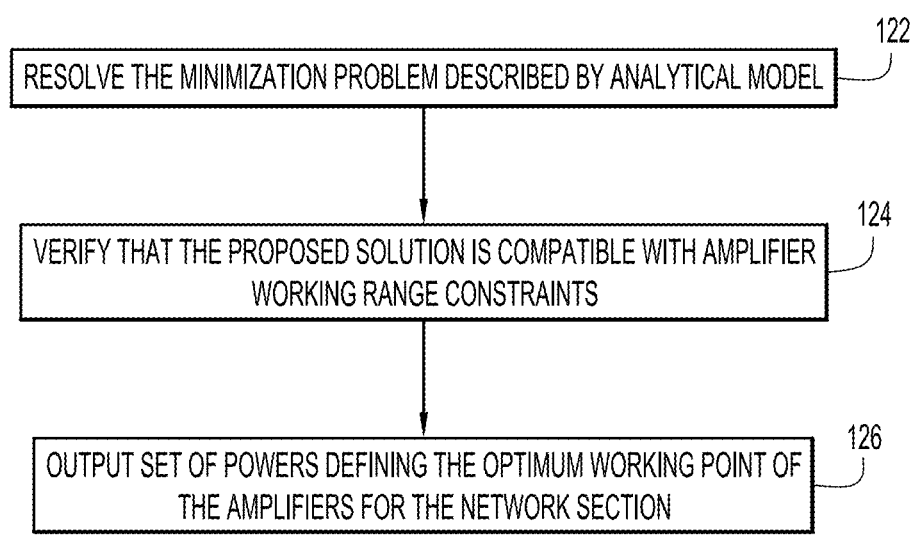

Turning now to FIG. 4, the operation 120 of resolving the minimization problem is described in more detail. Using the data (from operation 110) of all the amplifiers belonging to the same network section, at 122, resolution of the minimization problem described by analytical model (as indicated in the mathematical computations presented above) is performed to produce a proposed solution consisting of amplifier power levels. At 124, it is verified whether the proposed solution is compatible with amplifier working range constraints. Obviously, if the proposed amplifier power levels computed at 122 are outside the working range constraints of the amplifiers, then the solution is not a useful one. At 126, the set of amplifier powers defining the optimum working point of the amplifiers is output for the network section if it is determined to be compatible with amplifier working range constraints. The choice of the numerical algorithm used to solve the minimization problem exploits the fact that a minimum exists and, for the typical behavior of the noise figure vs. gain of commercial amplifiers, the minimum is unique. This can be generalized for cases in which the minimum is not unique, by changing the adopted numerical approach. The minimization problem can also be solved in different computational entities.

Figure 5:
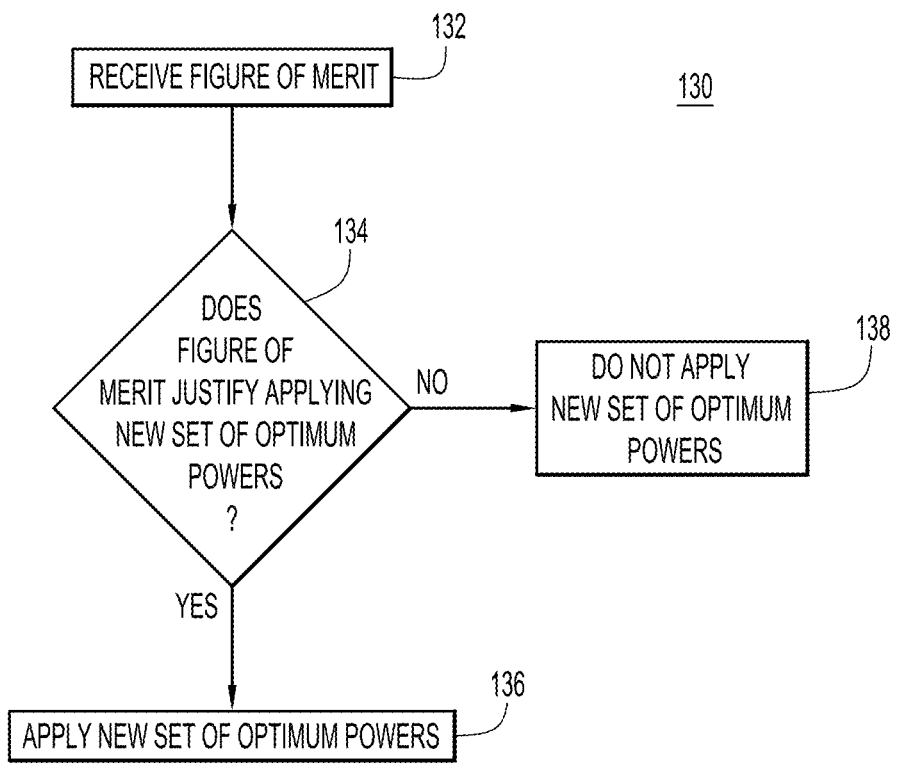

Referring now to FIG. 5, operation 130 of provisioning the amplifiers with the set of optimum power levels is described. At 132, a figure of merit (FoM) is received from an output of operation 140 (described is more detail below in connection with FIG. 6). At 134, the figure of merit is evaluated to determine whether applying the newly computed set of power levels to the amplifiers is justified. For example, the new set of optimum powers is applied/provisioned to the amplifiers if it takes advantage of channel network performance, i.e., improves network performance. Thus, if the figure of merit reveals that the new set of power levels will improve network performance, then at 136, the new set of power levels is provisioned to the amplifiers in the network section. Otherwise, the new set of power levels is not provisioned to the amplifiers as shown at 138.

Figure 6:
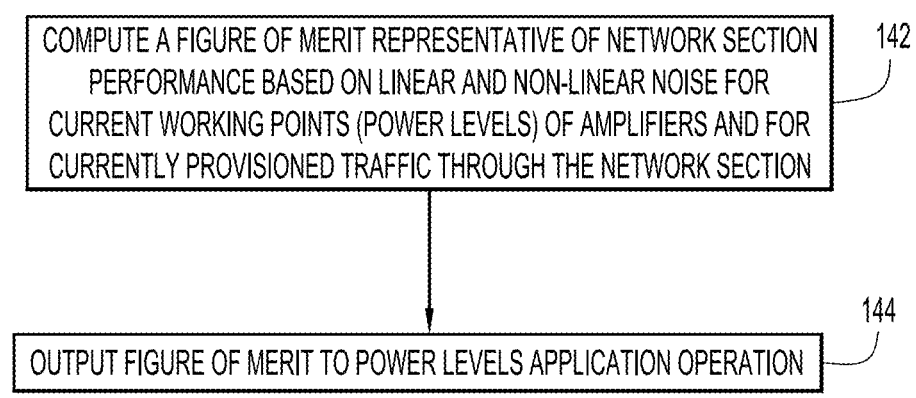

Turning now to FIG. 6, operation 140 to determine the linear and non-linear amplifier noise and an associated figure of merit, is described. At 142, the figure of merit representative of performance of the network section is computed based on linear and non-linear noise for current working points (power levels) of amplifiers and traffic through the network section. The figure of merit computation may be made using any models now known or hereinafter developed using the same data discovered/measured in operation 110. This figure of merit can be evaluated considering present traffic or full channel load traffic or whatever reference traffic conditions an adopted planning strategy requires. This figure of merit measures the performance of each section of the network and can be used for dynamic routing in Generalized Multi-Protocol Label Switching (GMPLS) applications. A different figure of merit can be used to trigger the application of the new power settings to the amplifiers. At 144, the figure of merit is output to the power levels application operation shown in FIG. 5, e.g., operation 132 in FIG. 5.

As mentioned above, once the output powers of the amplifiers have been set for a section of the network, the PLIs of the section may be evaluated. The contribution of the PLIs can be used to obtain an end-to-end PLI quantity for the optical link or path (consisting of several sections), by linearly adding the PLI of each section of the optical link or path.

Figure 7:
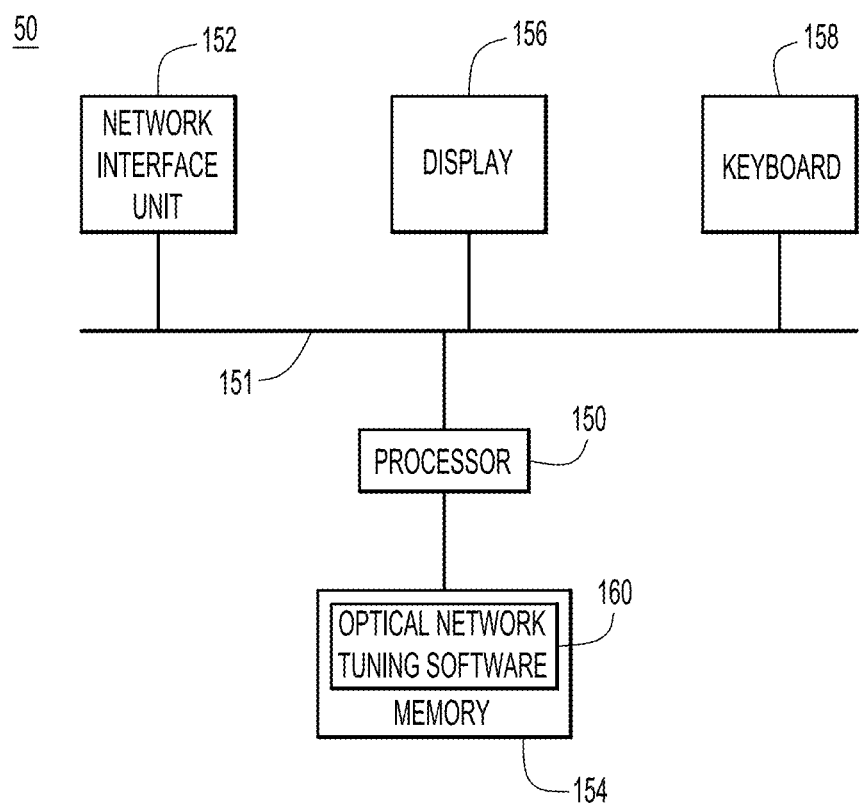
FIG. 7 is an example of a block diagram of a network management unit configured to perform one or more operations associated with the self-tuning techniques.

Many of the computations described above may be performed at a network management unit, e.g., network management unit 50 shown in FIG. 1. Accordingly, FIG. 7 illustrates an example of a block diagram of network management unit 50. The network management unit 50 includes a processor 150, a bus 151, network interface unit 152, memory 154, a display 156, and keyboard (and mouse) 158. The processor 150 interacts with the network interface unit 152, display 156 and keyboard 158 by the bus 151. The processor 150 may be a microprocessor or microcontroller (or multiple instances thereof) and executes instructions stored in memory 154. In particular, the memory 154 stores or is encoded with software instructions that, when executed by the processor 150, cause the processor 150 to perform the various operations described above in connection with FIGS. 1-6 for the network management unit 50.

The memory 154 may comprise read only memory (ROM), random access memory (RAM), magnetic disk storage media devices, optical storage media devices, flash memory devices, electrical, optical, or other physical/tangible memory storage devices. In general, the memory 154 may comprise one or more tangible (non-transitory) computer readable storage media (e.g., a memory device) encoded with software comprising computer executable instructions and when the software is executed (by the processor 150) it is operable to perform the operations described herein.

In summary, a method is provided comprising: for a section of an optical network comprising a plurality of spans between optical nodes, each optical node having an amplifier to amplify optical signals for transmission between optical nodes, obtaining physical network layer data from the optical nodes for use as input to an analytical model; computing a set of powers defining an optimum working point of the amplifiers in the network section based on variations in amplifier noise figure which depend on amplifier gain; computing a figure of merit representative of performance of the network section based on linear and non-linear noise at current power levels of the amplifiers; evaluating the figure of merit; and applying the set of powers to the amplifiers in the network section when evaluation of the figure of merit indicates that network performance improvement can be achieved by applying the set of powers to the amplifiers.

Similarly, in apparatus form, and apparatus is provided comprising a network interface unit configured to enable communications over a network and to obtain, for a section of an optical network comprising a plurality of spans between optical nodes, each optical node having an amplifier to amplify optical signals for transmission between optical nodes, physical network layer data from the optical nodes for use as input to an analytical model; and a processor coupled to the network interface unit. The processor is configured to: compute a set of powers defining an optimum working point of the amplifiers in the network section based on variations in amplifier noise figure which depend on amplifier gain; compute a figure of merit representative of performance of the network section based on linear and non-linear noise at current power levels of the amplifiers; evaluating the figure of merit; and apply the set of powers to the amplifiers in the network section when evaluation of the figure of merit indicates that network performance improvement can be achieved by applying the set of powers to the amplifiers.

Further still, in another form, one or more computer readable storage media are provided encoded with software comprising computer executable instructions and when the software is executed operable to: for a section of an optical network comprising a plurality of spans between optical nodes, each optical node having an amplifier to amplify optical signals for transmission between optical nodes, obtain physical network layer data from the optical nodes for use as input to an analytical model; compute a set of powers defining an optimum working point of the amplifiers in the network section based on variations in amplifier noise figure which depend on amplifier gain; compute a figure of merit representative of performance of the network section based on linear and non-linear noise at current power levels of the amplifiers; evaluate the figure of merit; and apply the set of powers to the amplifiers in the network section when evaluation of the figure of merit indicates that network performance improvement can be achieved by applying the set of powers to the amplifiers.

There are several advantages of the techniques presented herein. First, all channels working in the network section under consideration can be configured to operate with the best possible margin respect to the forward error correction (FEC) limit, independent of interface type and connection distance. Second, the maximum possible robustness against unpredictable impairments such as gain ripple and tilt, are achieved. Third, optical margins to be allocated in the design phase can be minimized. The system will always be in a well known state. The amount of information needed for the computations presented herein is reduced, thus reducing needed computational resources. In addition, the figure of merit of each section can be used for GMPLS control plane applications, so that there is a minimal amount of information to be shared between nodes of the network to identify the best performing optical path. Finally, these techniques can be easily imported into other network planning tools to achieve maximum performance of optical links.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    at a network interface unit, for a section of an optical network comprising a plurality of spans between optical nodes, each optical node having an amplifier to amplify optical signals for transmission between optical nodes, obtaining physical network layer data from the optical nodes for use as input to an analytical model;
    on a processor coupled to the network interface unit, executing the operations of:
        computing a set of powers defining an optimum working point of the amplifiers in the network section based on variations in amplifier noise figure which depend on amplifier gain;
        computing a figure of merit representative of performance of the network section based on linear and non-linear noise at current power levels of the amplifiers;
        evaluating the figure of merit; and
        applying the set of powers to the amplifiers in the network section when evaluation of the figure of merit indicates that network performance improvement can be achieved by applying the set of powers to the amplifiers.

2. The method of claim 1, wherein the obtaining the physical network layer data comprises obtaining data including one or more of: span loss between amplifier output and amplifier input at the edges of each span; span length, local loss and positions of concentrated losses; fiber type, chromatic dispersion and non-linear coefficients; noise figure versus gain for the amplifiers; and dense wavelength division multiplex grid characteristics.

3. The method of claim 1, wherein computing the set of powers is based on a minimization problem described by the analytical model.

4. The method of claim 1, further comprising executing on the processor coupled to the network interface unit the operations of: verifying whether the set of powers is compatible with amplifier working range constraints, and outputting the set of powers for use if it is determined to be compatible with amplifier working range constraints.

5. The method of claim 1, wherein computing the figure of merit is based further on currently provisioned traffic through the section.

6. The method of claim 1, wherein evaluating the figure of merit is based on current traffic conditions.

7. The method of claim 1, wherein evaluating the figure of merit is based on fully loaded channel traffic.

8. The method of claim 1, wherein evaluating the figure of merit is based on reference traffic according to a network planning strategy.

9. The method of claim 1, further comprising executing on the processor coupled to the network interface unit the operations of: evaluating physical light impairments after the set of powers have been set for each of a plurality of network sections of an optical link, and linearly adding the physical light impairments of the plurality of sections to obtain an end-to-end physical light impairment quantity for the optical link.

10. The method of claim 1, wherein obtaining the physical network layer data comprises discovering, retrieving or measuring with a controller card at each optical node.

11. The method of claim 1, wherein obtaining comprises obtaining the physical network layer data from a software design tool characterizing the section of the optical network.

12. An apparatus comprising:
    a network interface unit configured to enable communications over a network and to obtain, for a section of an optical network comprising a plurality of spans between optical nodes, each optical node having an amplifier to amplify optical signals for transmission between optical nodes, physical network layer data from the optical nodes for use as input to an analytical model; and a processor coupled to the network interface unit, wherein the processor is configured to:
- compute a set of powers defining an optimum working point of the amplifiers in the network section based on variations in amplifier noise figure which depend on amplifier gain;
- compute a figure of merit representative of performance of the network section based on linear and non-linear noise at current power levels of the amplifiers;
- evaluate the figure of merit; and
- apply the set of powers to the amplifiers in the network section when evaluation of the figure of merit indicates that network performance improvement can be achieved by applying the set of powers to the amplifiers.

13. The apparatus of claim 12, wherein the processor is configured to compute the set of powers based on a minimization problem described by the analytical model.

14. The apparatus of claim 12, wherein the processor is further configured to verify whether the set of powers is compatible with amplifier working range constraints, and output the set of powers for use if it is determined to be compatible with amplifier working range constraints.

15. The apparatus of claim 12, wherein the processor is configured to obtain the physical network layer data including one or more of: span loss between amplifier output and amplifier input at the edges of each span; span length, local loss and positions of concentrated losses; fiber type, chromatic dispersion and non-linear coefficients; noise figure versus gain for the amplifiers; and dense wavelength division multiplex grid characteristics.

16. The apparatus of claim 12, wherein the processor is further configured to evaluate physical light impairments after the set of powers have been set for each of a plurality of network sections of an optical link, and linearly add the physical light impairments of the plurality of sections to obtain an end-to-end physical light impairment quantity for the optical link.

17. One or more non-transitory computer readable storage media encoded with software comprising computer executable instructions that when executed perform the operations of:
- for a section of an optical network comprising a plurality of spans between optical nodes, each optical node having an amplifier to amplify optical signals for transmission between optical nodes, obtain physical network layer data from the optical nodes for use as input to an analytical model;
- compute a set of powers defining an optimum working point of the amplifiers in the network section based on variations in amplifier noise figure which depend on amplifier gain;
- compute a figure of merit representative of performance of the network section based on linear and non-linear noise at current power levels of the amplifiers;
- evaluate the figure of merit; and
- apply the set of powers to the amplifiers in the network section when evaluation of the figure of merit indicates that network performance improvement can be achieved by applying the set of powers to the amplifiers.

18. The non-transitory computer readable storage media of claim 17, further comprising instructions that when executed compute the set of powers based on a minimization problem described by the analytical model.

19. The non-transitory computer readable storage media of claim 17, further comprising instructions that when executed verify whether the set of powers is compatible with amplifier working range constraints, and output the set of powers for use if it is determined to be compatible with amplifier working range constraints.

20. The non-transitory computer readable storage media of claim 17, further comprising instructions that when executed evaluate physical light impairments after the set of powers have been set for each of a plurality of network sections of an optical link, and linearly add the physical light impairments of the plurality of sections to obtain an end-to-end physical light impairment quantity for the optical link.

* * * * *